(12) United States Patent
Gelbert et al.

(10) Patent No.: US 6,321,659 B1
(45) Date of Patent: Nov. 27, 2001

(54) RAILWAY VEHICLE WITH A STREAMLINED TERMINAL PORTION

(75) Inventors: Lutz Gelbert, Berlin; Michael Sohn, Henningsdorf; Gerhard Algermissen, Stuttgart, all of (DE)

(73) Assignee: DaimlerChrysler Rail Systems GmbH (DE)

( * ) Notice: Subject to any disclaimer, the term of this patent is extended or adjusted under 35 U.S.C. 154(b) by 0 days.

(21) Appl. No.: 09/528,081

(22) Filed: Mar. 17, 2000

(30) Foreign Application Priority Data

Mar. 18, 1999 (DE) .............................................. 199 12 144

(51) Int. Cl.⁷ .................................................... B61D 17/00

(52) U.S. Cl. ......................... 105/1.3; 105/1.1; 296/180.1

(58) Field of Search ............................. 105/1.1, 1.2, 1.3, 105/15; 296/180.1, 180.2, 180.4

(56) References Cited

U.S. PATENT DOCUMENTS

| | | | |
|---|---|---|---|
| 2,149,161 | * 2/1939 | Brynes | 105/1.3 |
| 3,557,712 | * 1/1971 | Milenkovic | 105/3 |
| 3,957,232 | * 5/1976 | Sebrell | 244/123 |
| 4,170,377 | * 10/1979 | Ingram | 296/180.1 |
| 5,240,306 | * 8/1993 | Flemming | 296/180.4 |
| 5,375,903 | * 12/1994 | Lechner | 296/180.1 |
| 5,546,865 | * 8/1996 | Haentjens et al. | 105/1.2 |
| 5,653,493 | * 8/1997 | Spears | 296/180.2 |
| 5,842,734 | * 12/1998 | Lechner | 296/180.1 |

* cited by examiner

*Primary Examiner*—S. Joseph Morano
*Assistant Examiner*—Lars A. Olson
(74) *Attorney, Agent, or Firm*—Webb Ziesenheim Logsdon Orkin & Hanson, P.C.

(57) ABSTRACT

On a railway vehicle for high-speed railways, there is an airflow breakaway or spoiler device in the area between a center part and a conically tapering terminal part to increase the dynamic stability of the car running on the end of the train.

20 Claims, 1 Drawing Sheet

RAILWAY VEHICLE WITH A STREAMLINED TERMINAL PORTION

BACKGROUND OF THE INVENTION

1. Field of the Invention

This invention relates to a railway vehicle with a vehicle body having a streamlined terminal portion.

2. Description of the Prior Art

On railway vehicles designed for high-speed travel, it is very generally known that the leading and the trailing terminal portions of the vehicle in the direction of travel can be realized in a streamlined fashion, whereby the cross section of the respective vehicle bodies tapers toward the free end. The remaining portions of the vehicle body, on the other hand, have an essentially uniform cross section over their remaining length. Railway vehicles realized in this manner can be operated with the same dynamic characteristics in either direction of travel. In operation, it has been found that unstable running conditions can occur on the rear portion of the vehicle, which are related to unsteady aerodynamic forces.

SUMMARY OF THE INVENTION

The object of the invention is to adopt measures on a railway vehicle with a vehicle body having a streamlined terminal portion where the slip conditions of the air flow on the end of the train can be favorably influenced to improve the riding qualities.

In one embodiment of a railway vehicle with a spoiler device on the rear end of the train, an unsteady flow of air over and around the stern of the vehicle is prevented. In particular, the spoiler device creates a breakaway of the air flow over the stern of the vehicle along a defined line. On a slender, smooth vehicle stern, the fluctuation in the breakaway point that otherwise occurs leads to an asymmetrical shedding of vortices that varies over time, and that in turn can lead to fluctuating lateral forces on the vehicle stern and thus to the excitation of vibrations.

To keep the breakaway edge as low as possible, it is advisable to place the breakaway edge slightly ahead (upstream) of or even in the vicinity of the point on the stern where, on average, the breakaway occurs without a breakaway edge. In this manner, as a result of a relatively small modification of the boundary layer flow over the surface of the stern, the chronological behavior of large flow areas can be controlled. If, for structural reasons, the breakaway device must be placed farther forward (upstream), the height of the breakaway edge must be correspondingly greater. However, the height of the flow breakaway edge can also be variable, for example as a function of the speed of travel. The spoiler device is preferably provided directly on the shell surface of the terminal portion, so that it can be integrated into the vehicle body. The spoiler device can thereby extend in the manner of a band in a peripheral direction of the terminal portion at least over a portion of the shell surface. In particular, the spoiler device is oriented symmetrically on the side wall segments and in the vicinity of the roof of the terminal portion. The airflow breakaway device can lie in a plane that is perpendicular to the longitudinal axis of the vehicle. Preferably, however, the plane is inclined so that the beginning of the desired air flow breakaway begins in different longitudinal areas of the vehicle body.

As the active element, the airflow breakaway device preferably has a band-shaped spoiler web, which can also consist of a plurality of individual parts and can be connected on its longitudinal side edge that is directed toward the central portion of the vehicle housing flush with the adjacent shell surface wall of the vehicle body. In its functional position longitudinal lateral edge that is oriented parallel to the longitudinal side edge, and points essentially toward the end of the terminal portion extends radially outside beyond the neighboring shell surface wall, so that the required elevated breakaway edge is formed.

To make it possible to operate the railway vehicle in either of the two directions of travel, the airflow breakaway device can be deactivated when the terminal portion which is equipped with the breakaway device is used as the leading end of the train. For this purpose, the spoiler device is equipped with a drive device which is coupled with the spoiler web and, when necessary, retracts the spoiler web flush into the shell surface of the vehicle body. For this purpose, a suitable groove can be provided in the shell surface of the vehicle body, in which not only can the spoiler web be retracted flush, but which also holds the drive device. The drive device is preferably a flexible hose which is firmly connected on one hand in the groove and on the other hand with the spoiler web, and is connected to a controllable hydraulic source. By inflating the hose, the flexible spoiler web which is held on one hand on the vehicle body and is provided in particular with a hinge, can be extended to perform its function as a spoiler, or when a vacuum is applied to the hose, the spoiler edge can be retracted flush into the body contour. This position is used in particular when the direction of travel of the train is reversed (that is, the portion that was previously the trailing end of the train now becomes the leading end). The smooth streamlined shape of the vehicle body required in the direction of travel is then guaranteed. To achieve a flush transition between the shell surface wall and the spoiler web, the longitudinal edges of the groove that is provided to house the drive mechanism are stepped back, as a function of the thickness of the material of the spoiler web.

When the spoiler web is manufactured from inflexible material, it is appropriate to form the spoiler web from a plurality of individual parts. The individual parts thereby do not need to be connected directly to one another, because even the premature excitation of small eddies for the desired promotion of the airflow breakaway on the terminal portion can lead to sufficient results over portions of the shell surface.

As a result of the attachment of a controllable airflow breakaway device that is integrated directly into the body surface of the vehicle housing, the flow conditions can thereby be optimized as a function of the direction of travel of the train using simple means. At high speeds, it thereby becomes possible to prevent unstable riding characteristics on the respective train end, because such instabilities could otherwise result from an unsteady shedding of vortices on the tapering terminal portion of the vehicle.

BRIEF DESCRIPTION OF THE DRAWINGS

The invention is explained in greater detail below with reference to the two exemplary embodiments that are illustrated in the accompanying drawings, in which.

DESCRIPTION OF THE PREFERRED EMBODIMENTS

Figure 1:
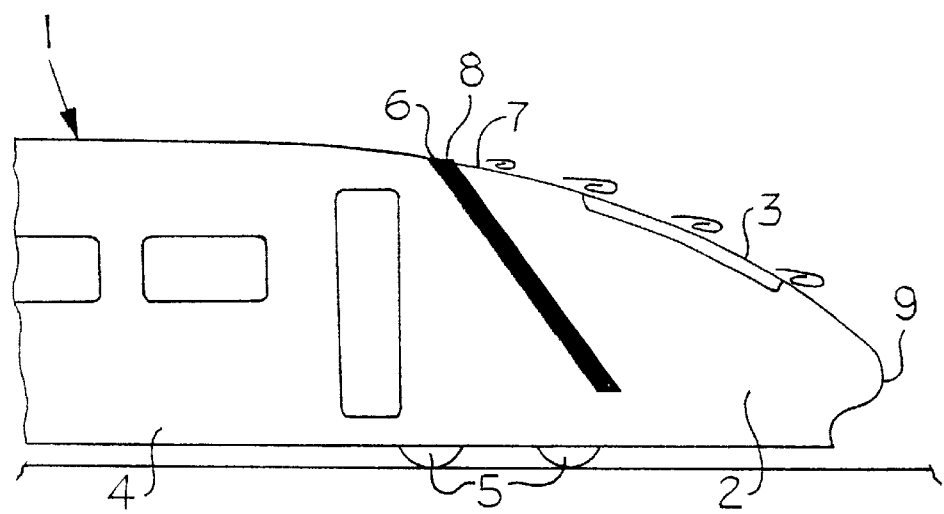
FIG. 1 is a sectional sideview of a railway vehicle having a terminal portion, with an integrated airflow breakaway or spoiler device.

Referring to FIG. 1, on a railway vehicle, a vehicle body 1 tapers in a streamlined fashion toward an end 9 of the train in the vicinity of the terminal portion 2. The terminal portion 2 is equipped with a driver's control compartment which is provided with windows 3 in the top front portion. The remaining center portion 4 of the vehicle body that points toward the center of the train has an essentially uniform cross section surface over its entire length. The vehicle body 1 is supported by rail wheels 5.

If a railway vehicle built in this manner is used on the end of a train that travels at high speed, there is a risk that the airflow during travel, on account of the aerodynamic design of the terminal portion 2, will remain in contact with the tapering contour for a very long time and will only break away from its shell surface very late. Furthermore, the breakaway will be concentrated at different points of the shell surface of the sharply tapered cross section area of the terminal portion 2. To prevent the very strong turbulence of the air flow that can occur and is distributed alternatingly and asymmetrically over the shell surface of the terminal portion, there is an airflow breakaway device or spoiler 6 in the transitional area between the center part 4 and the terminal portion 2 with the tapering cross section.

In this case, the spoiler 6 extends in a symmetrical configuration beyond the two ascending side walls and above the area of the roof 7 that lies between them. The spoiler 6 is attached directly to the shell surface of the terminal portion 2. The spoiler 6 has an airflow breakaway edge 8 which is elevated with respect to the neighboring shell surface of the terminal portion 2. The spoiler 6, which is realized in the shape of a band, thereby lies on the outer edge of a cross sectional plane of the vehicle housing 1, which cross sectional plane is inclined from bottom to top toward the middle portion 4 of the vehicle body 1, so that the lower segments lie closer to the free end 9 of the terminal portion 2 than the central segment that is associated with the roof 7.

Figure 2:
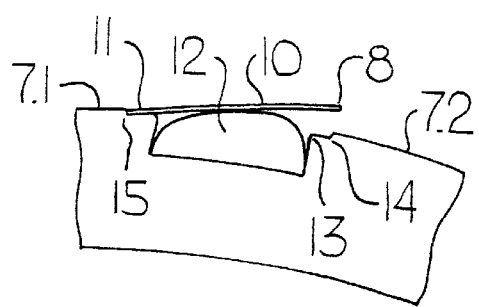
FIG. 2 is a cross sectional view of a first embodiment of the airflow breakaway device.
Figure 3:
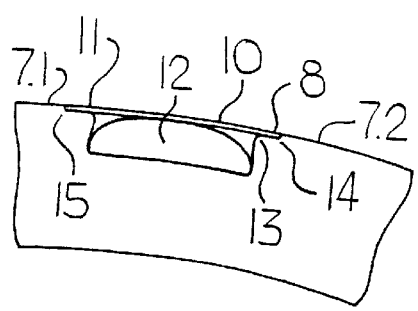
FIG. 3 illustrates the airflow breakaway device of FIG. 2 in a deactivated position breakaway device.
Figure 4:
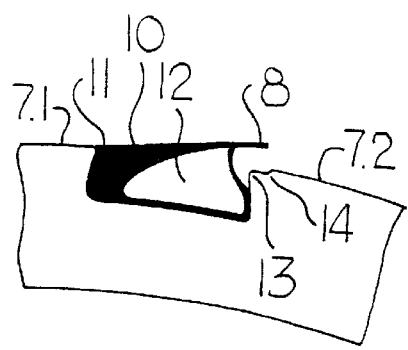
FIG. 4 is a cross-sectional view of a second embodiment of the airflow breakaway device.

Referring now to FIGS. 1–5, spoiler 6 has a spoiler web 10 which is realized in the form of a sufficiently elastic strip and which extends over the side walls and the roof area 7 of the terminal portion 2 in the above mentioned inclined cross sectional plane. On its side edge 11 that is directed toward the center portion 4 of the vehicle body 1, the spoiler web 10 is connected in a flush manner with the neighboring shell surfaces of the vehicle body 1 or its terminal portion 2. The opposite lateral edge of the spoiler web that is directed toward the end 9 and forms the breakaway edge 8, in its functional position as illustrated in FIGS. 1, 2 and 4, is at a specified distance perpendicular to the respective neighboring shell surface segment, which is shown for the roof area 7 in FIGS. 2 to 5. When the train is travelling at a high speed, the spoiler edge 8, illustrated in FIGS. 1, 2 and 4, is radially extended with respect to the shell surface 7.2 and causes a turbulence in the airflow, which has up to then been largely laminar, as early as at the transition from the normally configured center portion of the train to the tapering terminal portion 2. A height of the spoiler edge 8 that is sufficient to excite turbulence in the layer closest to the shell surface is sufficient, and contributes to the formation of turbulence in the air layers that are farther outside. The breakaway of the air flow from the terminal portion is therefore distributed as uniformly as possible over the entire length of the terminal portion 2.

Figure 5:
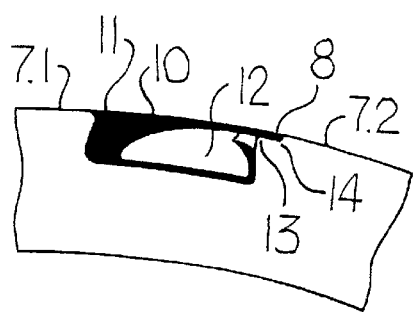
FIG. 5 illustrates the airflow breakaway device of FIG. 4 in a deactivated position.

The step height of the spoiler 8 with respect to the shell surface 7.2 can be variable, for example as a function of the speed or the direction of travel of the vehicle. For this purpose, the spoiler device 6 is equipped with a drive device 12, for example an inflatable hose. For this purpose, a groove 13 is formed in the shell surface of the vehicle 1 of of the terminal portion 2, and this groove 13 holds the drive device 12. The hose which is the drive device 12 is thereby on one hand supported in the groove and on the other hand is connected with the inside of the spoiler web 10. The spoiler web 10 is fixed on its longitudinal lateral edge 11 that lies against the spoiler edge 8 with respect to the neighboring shell surface of the vehicle body 1, and is elastic, at least in the neighboring area, or is provided with a hinge device. By inflating the hose of the drive device 12, the spoiler web 10 can be inclined as required, and thus varies the step height of the spoiler edge 8. If the pressure in the hose of the drive device 12 is thereby reduced or if a vacuum is applied to the hose, then the spoiler web 10 is retracted into the contour of the vehicle body, as shown in FIGS. 3 and 5. In this deactivated position, the spoiler 6 does not have any effect. The railway vehicle can accordingly be operated in the reverse direction of travel, with the terminal portion 2 as the leading end of the train (in front in the direction of travel), without the spoiler thereby generating any undesirable flow conditions. To thereby achieve the continuous transition, the shell wall 7.2 is recessed in a step 14 which is analogous to the groove 13, whereby the height of the step 14 is adapted to the material thickness of the spoiler edge 8. In a corresponding manner, the opposite longitudinal lateral edge 11 of the spoiler web 10 as shown in FIGS. 2 and 3 is inserted in a corresponding step 15, because this longitudinal lateral edge 11 overlaps the neighboring shell wall segment 7.1.

In the exemplary embodiment illustrated in FIGS. 4 and 5, on the other hand, the spoiler web 10 is an integral component of the hose of the drive device 12 and is integrated with the hose, and is made of the same material, to form a one-piece unit. The portion of the hose that is connected with the longitudinal lateral edge thereby has an increased wall thickness that decreases continuously toward the spoiler edge 8. It thereby becomes possible to achieve a sufficient rigidity of the spoiler web 10 and a continuous extension by pumping up the hose. The overlap between the spoiler web 10 and the neighboring shell wall 7.1 is therefore unnecessary.

What is claimed is:

1. A railway vehicle, comprising:

a vehicle body having two ascending side walls and a roof extending between the sides walls, with the vehicle body including at least one streamlined, tapering terminal portion, and with the terminal portion including a surface defining a groove extending over a portion of one side wall, over the roof of the terminal portion, and downward over a portion of the other side wall of the terminal portion;

an airflow deflector device located in the groove in the terminal portion and movable from an extended position extended peripherally outward from the surface of the terminal portion to a retracted position received in the groove in the terminal portion and in which the airflow deflector device is flush with the surface of the terminal portion; and a drive device located in the groove in the terminal portion for moving the airflow deflector device between the extended and retracted positions, wherein the airflow deflector device in the extended position extends symmetrically peripherally outward from the surface of the vehicle body.

2. The railway vehicle as claimed in claim 1, wherein the airflow deflector device includes a spoiler web that extends peripherally outward from the surface of the terminal portion in the extended position of the airflow deflector device and forms an airflow deflector edge of the airflow deflector device.

3. The railway vehicle as claimed in claim 2, wherein the spoiler web is in the form of an elastic strip extendable peripherally outward from the surface of the terminal portion of the vehicle body, and wherein in the retracted position of the airflow deflector device the spoiler web lies flush with the surface of the terminal portion.

4. The railway vehicle as claimed in claim 2, wherein the vehicle body includes a center portion located adjacent and contiguous with the terminal portion, and wherein the spoiler web has a longitudinal lateral edge that is directed toward the center portion of the vehicle body and lies flush with the adjacent surface of the vehicle body.

5. The railway vehicle as claimed in claim 4, wherein the spoiler web is pivotable outward about its longitudinal lateral edge.

6. The railway vehicle as claimed in claim 1, wherein the vehicle body includes a center portion located adjacent and contiguous with the terminal portion, and wherein the groove for the airflow deflector device is located in a transition area between the center portion and the terminal portion of the vehicle body.

7. The railway vehicle as claimed in claim 6, wherein the center portion of the vehicle body has a largely constant cross sectional area over its length.

8. The railway vehicle as claimed in claim 1, wherein the groove for the airflow breakaway device is inclined along side walls of the terminal portion with respect to a vertical plane passing through the terminal portion of the vehicle body.

9. The railway vehicle as claimed in claim 8, wherein the vehicle body includes a center portion located adjacent and contiguous with the terminal portion, and wherein the groove inclines from a transition area between the center portion and terminal portion toward an end of the terminal portion.

10. The railway vehicle as claimed in claim 1, wherein the drive device is a flexible and inflatable hose which is located in the groove and is connected to a controllable pressure medium source.

11. The railway vehicle as claimed in claim 10, wherein the airflow deflector device includes a spoiler web that extends peripherally outward from the surface of the terminal portion in the extended position of the airflow deflector device and forms an airflow deflector edge of the airflow deflector device, and wherein inflation of the hose causes the spoiler web to extend outward from the surface of the terminal portion.

12. The railway vehicle as claimed in claim 11, wherein the spoiler web and hose are integrally formed.

13. A railway vehicle, comprising:
a vehicle body having a center portion and at least one streamlined, tapering terminal portion located adjacent and contiguous with the center portion, with the terminal portion having a surface defining a groove extending peripherally and symmetrically over a portion of the terminal portion;
an airflow deflector device located in the groove in the terminal portion and movable from an extended position extended peripherally outward from the surface of the terminal portion to a retracted position received in the groove in the terminal portion and in which the airflow deflector device is flush with the surface of the terminal portion; and
a flexible and inflatable hose located in the groove in the terminal portion for moving the airflow deflector device between the extended and retracted positions.

14. The railway vehicle as claimed in claim 13, wherein the airflow deflector device includes a spoiler web that extends peripherally outward from the surface of the terminal portion in the extended position of the airflow deflector device and forms an airflow deflector edge of the airflow deflector device.

15. The railway vehicle as claimed in claim 14, wherein the spoiler web and hose are integrally formed.

16. The railway vehicle as claimed in claim 14, wherein the spoiler web is in the form of an elastic strip extendable peripherally outward from the surface of the terminal portion of the vehicle body, and wherein in the retracted position of the airflow deflector device the spoiler web lies flush with the surface of the terminal portion.

17. The railway vehicle as claimed in claim 14, wherein the spoiler web has a longitudinal lateral edge that is directed toward the center portion of the vehicle body and lies flush with the adjacent surface of the vehicle body.

18. The railway vehicle as claimed in claim 13, wherein the groove for the airflow deflector device is located in a transition area between the terminal portion and the center portion of the vehicle body.

19. The railway vehicle as claimed in claim 13, wherein the center portion of the vehicle body has a largely constant cross sectional area over its length.

20. A railway vehicle, comprising:
a vehicle body having two ascending side walls and a roof extending between the side walls, with the vehicle body having a center portion and at least one streamlined, tapering terminal portion located adjacent and contiguous with the terminal portion, with the terminal portion including a surface defining a groove extending peripherally from a lower portion of one side wall, over the roof of the terminal portion, and downward to a lower portion of the other side wall of the terminal portion, and with the groove inclining from a transition area between the center portion and the terminal portion toward an end of the terminal portion;
an airflow deflector device located in the groove in the terminal portion of the vehicle body and movable from an extended position extended peripherally outward from the surface of the terminal portion to a retracted position received in the groove in the terminal portion and in which the airflow deflector device is flush with the surface of the terminal portion; and
a drive device located in the groove in the terminal portion for moving the airflow deflector device between the extended and retracted positions,
wherein the airflow deflector device in the extended position extends symmetrically peripherally outward from the surface of the vehicle body.

\* \* \* \* \*